United States Patent
Jammalamadaka et al.

(10) Patent No.: US 8,515,966 B2
(45) Date of Patent: Aug. 20, 2013

(54) ANALYZING QUERIES TO GENERATE PRODUCT INTENTION RULES

(75) Inventors: Ravi Chandra Jammalamadaka, Campbell, CA (US); Naren Chittar, Mountain View, CA (US); Sanjay Pundlkrao Ghatare, San Jose, CA (US)

(73) Assignee: eBay Inc., San Jose, CA (US)

( * ) Notice: Subject to any disclaimer, the term of this patent is extended or adjusted under 35 U.S.C. 154(b) by 688 days.

(21) Appl. No.: 12/684,866

(22) Filed: Jan. 8, 2010

(65) Prior Publication Data

US 2010/0179956 A1 Jul. 15, 2010

Related U.S. Application Data

(60) Provisional application No. 61/143,691, filed on Jan. 9, 2009.

(51) Int. Cl.
*G06F 17/30* (2006.01)
(52) U.S. Cl.
USPC ........................................ 707/748
(58) Field of Classification Search
None
See application file for complete search history.

(56) References Cited

U.S. PATENT DOCUMENTS

2010/0114654 A1* 5/2010 Lukose et al. .................. 705/10

OTHER PUBLICATIONS

Tamir et al., "On a confidence gain measure for association rule discovery and scoring", School of Computer Science and Engineering, The Hebrew University of Jerusalem, Israel, Published online: Sep. 5, 2005, Springer-Verlag 2006.*
Hipp et al., "Algorithms for Association Rule Mining—A General Survey and Comparison", Wilhelm Schickard-Institute University of Tobingen, SIGKDD Explorations, vol. 2, Issue 1, 2000.*

* cited by examiner

*Primary Examiner* — James Trujillo
*Assistant Examiner* — Mohsen Almani
(74) *Attorney, Agent, or Firm* — Schwegman Lundberg & Woessner, P.A.

(57) ABSTRACT

A method to generate a first product intention rule is described. The method includes generating a keyword support value for a keyword in a query, the keyword support value representing a level of use of the keyword in one or more queries received at an e-commerce portal. A keyword confidence value is generated to represent uses of the keyword in the one or more queries associated with a purchase of a first product. A first product intention rule is generated based on the keyword support value transgressing a support threshold and the keyword confidence value transgressing a confidence threshold. The first product intention rule is stored in a database.

15 Claims, 11 Drawing Sheets

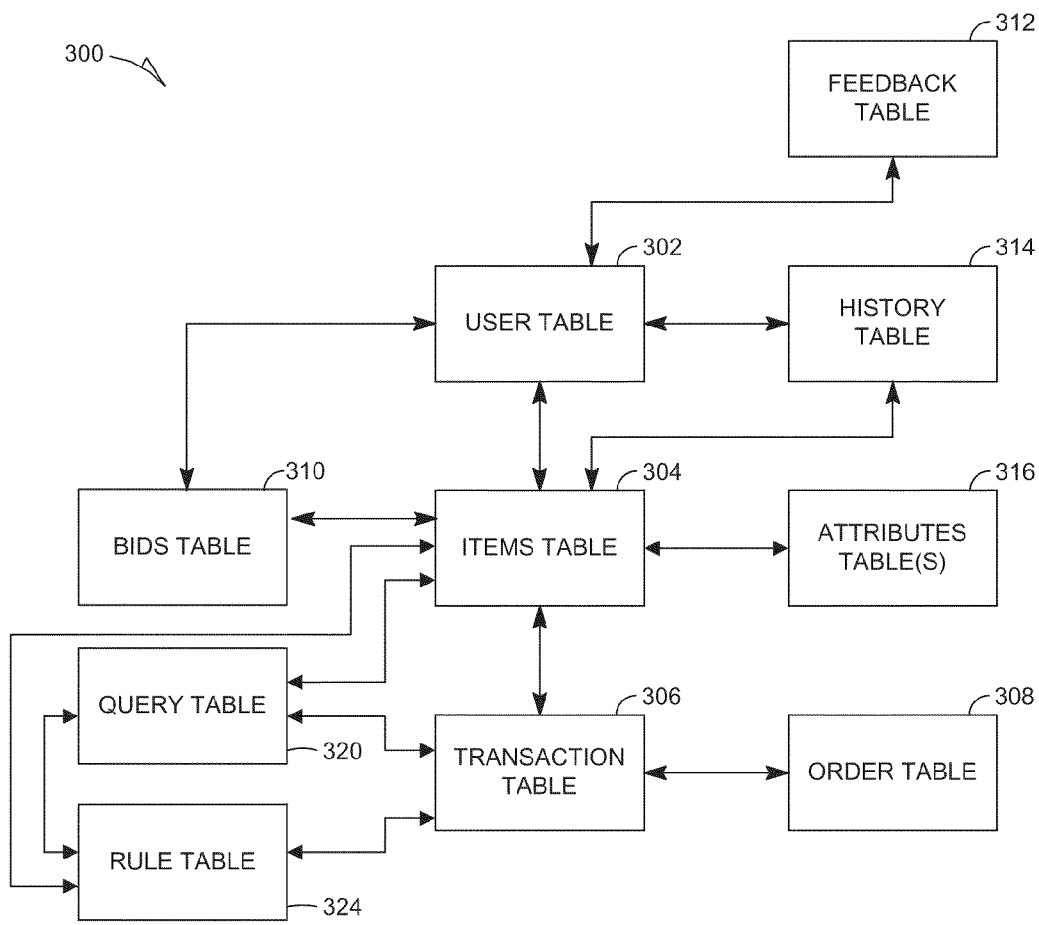
FIG. 3A
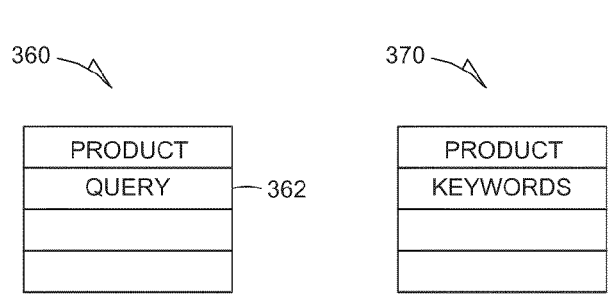
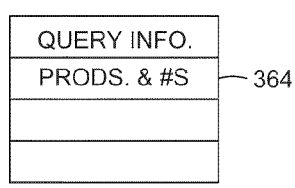
FIG. 3B
FIG. 3C
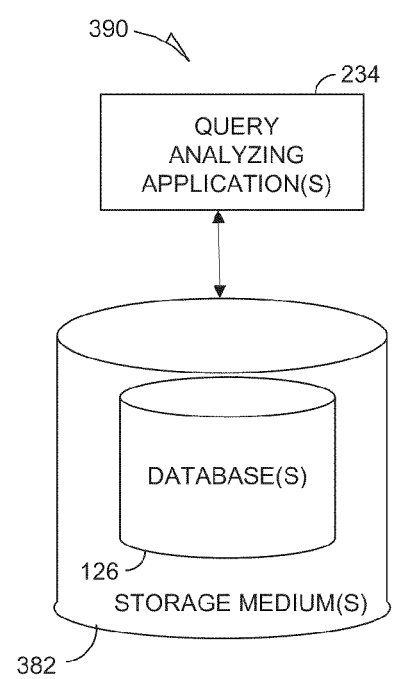
FIG. 3D

| QUERY INFORMATION | PRODUCTS AND THEIR COUNTS |
|---|---|
| DANISH SNACKS | DANISH_COOKIES (9), DANISH_CHIPS (2) |
| IPOD | IPOD NANO (3), IPOD TOUCH (2), IPOD_ACCESSORIES (1) |
| NANO | IPOD NANO (10), TATA NANO (2), IPOD_ACCESSORIES (2) |

ANALYZING QUERIES TO GENERATE PRODUCT INTENTION RULES

This application claims the priority benefit of U.S. Provisional Application No. 61/143,691, entitled "MINING PRODUCT INTENTION RULES FOR AN ECOMMERCE RECOMMENDER SYSTEM," filed Jan. 9, 2009, which is incorporated herein by reference.

TECHNICAL FIELD

The present application relates generally to the technical field of search engines, and, in one specific example, to analyzing search queries received at a publication system to generate product intention rules to associate keywords in the search queries with products.

BACKGROUND

Semantic search engines perform an analysis of a query provided by a user to determine the user's intent and then use knowledge gathered from the analysis to retrieve relevant items. The rationale is sound: the more the search engine knows about the user's requirements, the better the search results are.

A semantic search engine for an e-commerce portal (or other electronic publication system), such as a classifieds website, network-based marketplace, or retailer with a product-based inventory, needs to understand the product or products the user is interested in after the user issues the query, which contains one or more keywords, to the search engine. One example challenge that may exist includes providing relevant search results. In other words, an accurate prediction algorithm may go a long a way to increasing the relevancy of the items that are fetched from the inventory. For instance, assume that whenever users issue a query "ipod," the users are primarily interested in the iPod nano MPEG-1 Audio Layer 3 (MP3) player. In this case, all of the iPod accessories can be pruned away from the search results, even though the iPod accessories may contain the term "ipod." Another example challenge that may exist includes providing high quality product recommendations. An efficient recommendation system fosters purchases, hence generating revenue. Understanding the user's intent may allow the recommendation engine to make higher quality recommendations.

BRIEF DESCRIPTION OF THE DRAWINGS

Some embodiments are illustrated by way of example and not limitation in the figures of the accompanying drawings in which:

FIG. 3A is a high-level entity-relationship diagram illustrating various tables that may be maintained within the databases, and that are utilized by and support the applications;

FIG. 3B is a database table illustrating further details regarding the transaction table that is shown in FIG. 3A to be maintained within the databases;

FIG. 3C is a database table diagram illustrating further details regarding the rule table that is shown in FIG. 3A to be maintained within the databases;

FIG. 3D is a relationship diagram that shows relationships between the query applications and storage mediums;

DETAILED DESCRIPTION

Figure 1:
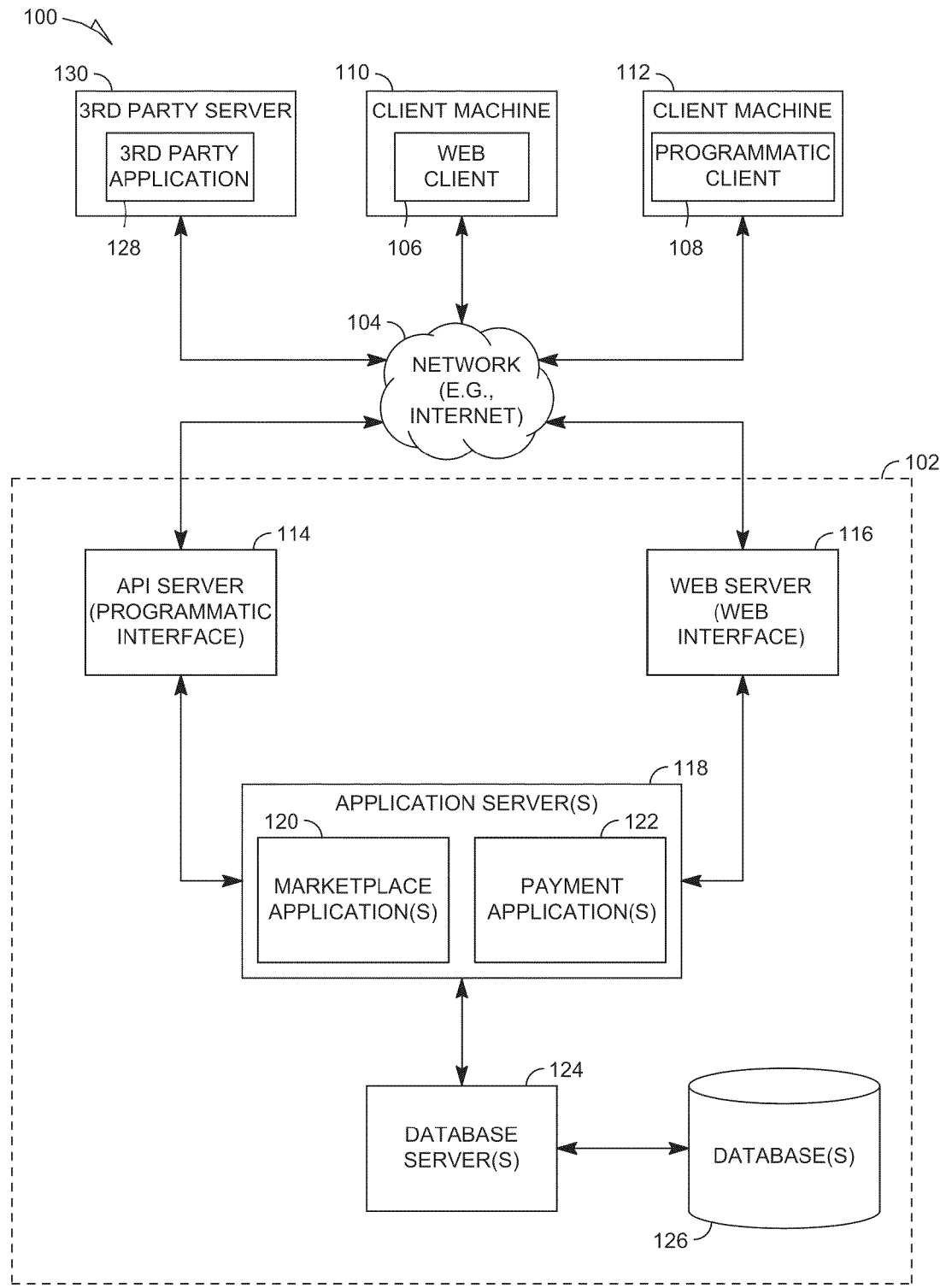
FIG. 1 is a network diagram depicting a client-server system, within which various example embodiments may be deployed.

In the following description, for purposes of explanation, numerous specific details are set forth in order to provide an understanding of various embodiments of the inventive subject matter. It will be evident, however, to those skilled in the art that embodiments may be practiced without these specific details. Further, well-known instruction instances, protocols, structures, and techniques have not been shown in detail. As used herein, the term "or" may be construed in an inclusive or exclusive sense.

In an example embodiment, a method is provided to generate a first product intention rule. The method includes generating a keyword support value for a keyword in a query, with the keyword support value representing a level of use of the keyword in one or more queries received at an e-commerce portal; generating a keyword confidence value representing uses of the keyword in the one or more queries associated with a purchase of a first product; generating a first product intention rule based on the keyword support value transgressing a support threshold and the keyword confidence value transgressing a confidence threshold; and storing the first product intention rule in a database.

In another example embodiment, a method to prioritize two or more product intention rules is provided. The method includes receiving a query; generating unique combinations of subsets of keywords used in the query; determining that one of the subsets matches two or more predetermined product intention rules; prioritizing the two or more predetermined product intention rules such that a first predetermined product intention rule precedes a second product intention rule based on a cardinality of keywords in the first product intention rule being larger than a cardinality of keywords in the second product intention rule; and based on the cardinality of keywords in the first product intention rule being equal to the cardinality of keywords in the second product intention rule, prioritizing the product intention rules such that the first predetermined product intention rule precedes the second product intention rule based on a confidence or a support of the first product intention rule being greater than a respective confidence or support of the second product intention rule.

Another example embodiment comprises a system to generate a first product intention rule. The system includes a support-generation module to generate a keyword support value for a keyword in a query, the keyword support value representing a level of use of the keyword in one or more queries received at an e-commerce portal; a confidence-generation module to generate a keyword confidence value representing uses of the keyword in the one or more queries associated with a purchase of a first product; a rule-generation module to generate a first product intention rule based on the keyword support value transgressing a support threshold and the keyword confidence value transgressing a confidence threshold; and a rule-storage module to store the first product intention rule in a database.

In another example embodiment, there is provided a system to prioritize two or more product intention rules. The system includes a query-reception means for receiving a query; a combination-generation means for generating unique combinations of subsets of keywords used in the query; a rule-matching means for determining that one of the subsets matches two or more predetermined product intention rules; a cardinality-prioritization means for prioritizing the two or more predetermined product intention rules such that a first predetermined product intention rule precedes a second product intention rule based on a cardinality of keywords in the first product intention rule being larger than a cardinality of keywords in the second product intention rule; and a support-confidence-prioritization means for, based on the cardinality of keywords in the first product intention rule being equal to the cardinality of keywords in the second product intention rule, prioritizing the product intention rules such that the first predetermined product intention rule precedes the second product intention rule based on a confidence or a support of the first product intention rule being greater than a respective confidence or support of the second product intention rule.

Architecture

FIG. 1 is a network diagram depicting a client-server system 100, within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the present invention is, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
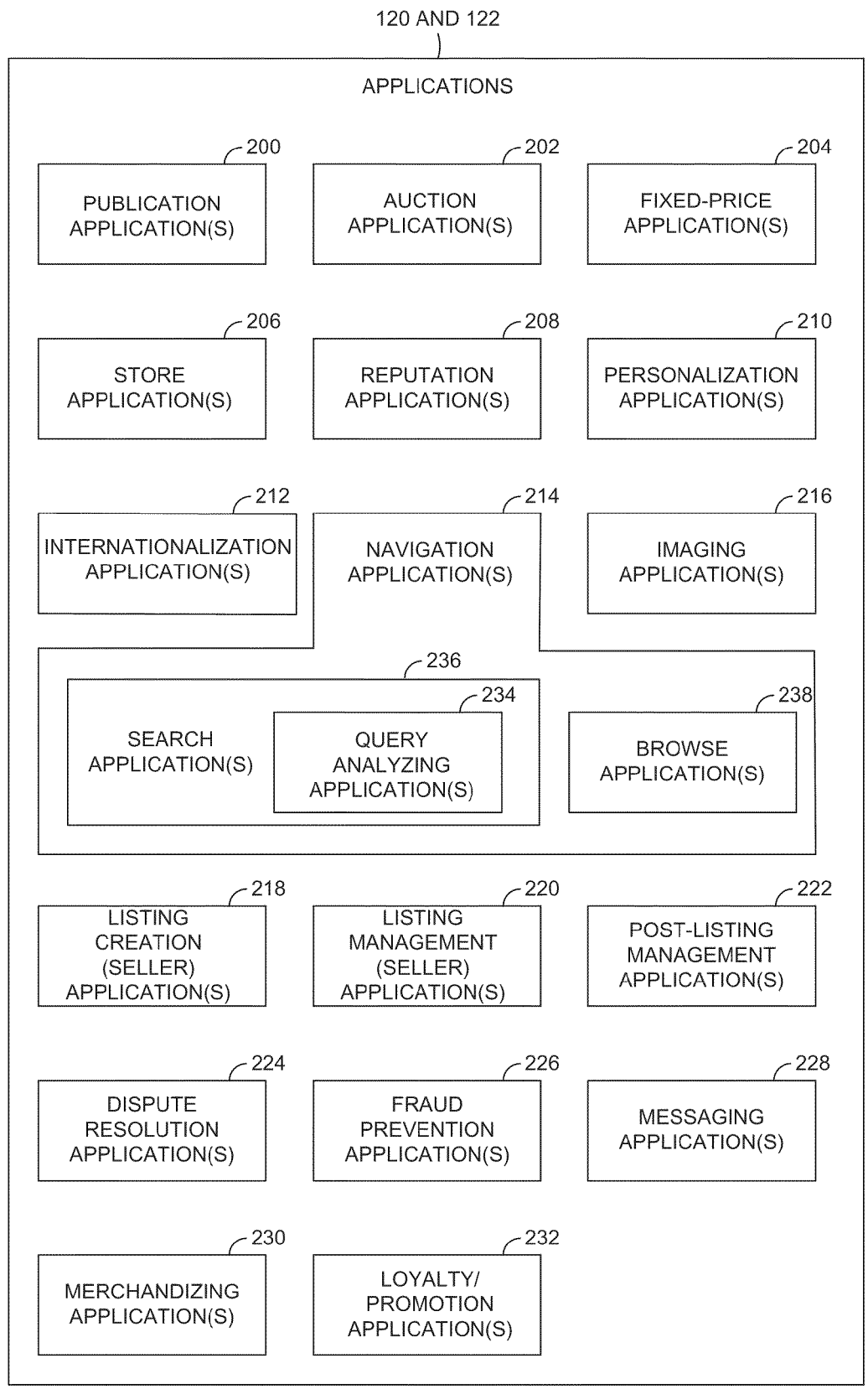
FIG. 2 is a block diagram illustrating multiple applications that, in one example embodiment, are provided as part of the networked system.

FIG. 2 is a block diagram illustrating multiple applications 120 and 122 that, in one example embodiment, are provided as part of the networked system 102. The applications 120 and 122 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may furthermore access one or more databases 126 via the database servers 128.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application 236 (as an example of a navigation application) may enable key word searches of listings published via the networked system 102. A browse application 238 may allow users to browse various category, catalogue, or inventory data structures according to which listings may be classified within the networked system 102. Various other navigation applications may be provided to supplement the search and browsing applications. For example, query analyzing applications 234 may analyze queries. The queries may be provided by a user, including a person or a machine, for example, via the 3rd party application 128, the web client 106, or the programmatic client 108. The queries may be received by the networked system 102 via, for example, the API server 114 or the web server 116, or otherwise be provided to or accessible by the application servers 118. The queries may be stored in a memory (not shown), transaction logs (not shown), the database 126, a file system (not shown), or another storage medium. The queries may be related to a purchase of one or more products, such as one or more products contained in an inventory associated with the networked system 102. The query analyzing applications 234 may determine associations between queries and other data, including product purchases, and may store information about the associations. Architectures and features of various embodiments of the query analyzing applications 234 are described in further detail below.

In order to make listings, available via the networked system 102, as visually informing and attractive as possible, the marketplace applications 120 may include one or more imaging applications 216 which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 80 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Data Structures

FIG. 3A is a high-level entity-relationship diagram illustrating various tables 300 that may be maintained within the databases 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record. Each item may also relate to one or more transactions for which records exist in the transaction table 306, one or more queries for which records exist in the query table 320, and one or more rules for which rules exist in the rule table 324.

A transaction table 306 contains a record for each transaction (e.g., a purchase or sale transaction) pertaining to items for which records exist within the items table 304. Each transaction, in turn, may relate to one or more items for which records exist in the items table 304, one or more queries for which records exist in the query table 320, and one or more rules for which records exist in the rule table 324.

An order table 308 is populated with order records, each order record being associated with an order. Each order, in turn, may be with respect to one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, with the currency attribute identifying the currency of a price for the relevant item as specified in by a seller.

Query table 320 is populated with query records, each query record being associated with, for example, a query received by the networked system 102. Each query, in turn, may relate to one or more transactions for which records exist within the transaction table 306, one or more items for which records exist in the items table 304, or one or more rules for which records exist in the rule table 324.

Rule table 324 is populated with rule records, each rule record being associated with, for example, a product intention rule that associates one or more keywords with an item or product. Each rule, in turn, may relate to one or more transactions for which records exist in the transaction table 306, one or more queries for which records exist in the query table 320, or one or more items for which items exist in the items table 304.

FIG. 3B is a database table diagram illustrating further details regarding embodiments 360 of the transaction table 306 that is shown in FIG. 3A to be maintained within the databases 126. As described above, the transaction table 306, the items table 304, the query table 320, and the rule table 324 may each contain fields for establishing one-to-many, many-to-one, and many-to-many relationships between transactions, items (or products), queries, and rules, respectively. For example, in an embodiment 362, the transaction table 306 includes a field for a "product" and a field for a "query," such that one of the query analyzing applications 234 may reach a determination that a query (or individual keywords in the query) specified in the "query" field of a record in the transaction table 306 is associated with, or relates to, a purchase of a product specified in the "product" field of the record. In an embodiment 364, the transaction table 306 includes a field for "query information" (shown as "QUERY INFO") and a field for "products and their counts" (shown as "PRODS. & #S"), such that the query analyzing applications 234 may reach a determination that a query specified in the "query information" field of a record in the transaction table 306 is associated with a number of purchases of each of one or more products specified in the "products and their counts" field of the record.

Figures 6A, 6B:
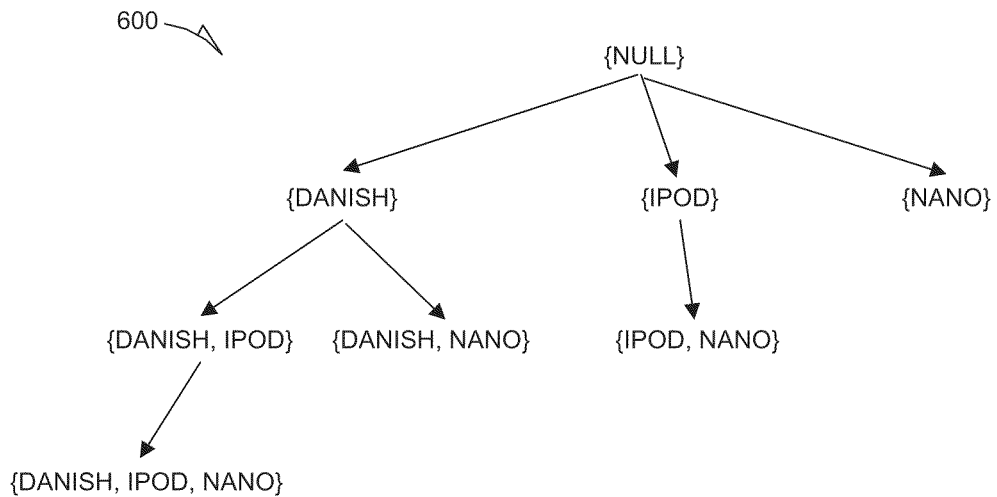
FIG. 6A is tree diagram of an example embodiment of an enumeration tree.
FIG. 6B is a table of example mappings of query information to the number of times particular products were purchased.

For example, a "query information" field may specify "danish snacks" and the "products and their counts" field may specify "danish_cookies (9), danish_chips (2)." Then one of the query analyzing applications 234 may interpret these specifications in reaching a determination that, over a specific time frame, users who entered a query containing one or both of the keywords "danish snacks" ended up purchasing Danish cookies nine times and Danish chips two times. FIG. 6B illustrates additional examples of values that may be specified in the "query information" field and the "products and their counts" field. In various example embodiments, information about transactions, including information that the query analyzing applications 234 may analyze to determine associations between queries and products, may be stored in a transaction log, a file system, or another storage medium instead of or in addition to a database table, such as one of the tables 300 of FIG. 3A. Notably, additional information about transactions, including associated query information (for example, subsets of keywords used in the queries, unique combinations of the subsets, individual keywords, etc.) and product information may be received or stored such that the query analyzing applications 234 may analyze the additional information in determining associations between the queries and the products.

FIG. 3C is a database table diagram illustrating further details regarding an embodiment 370 of the rule table 324 that is shown in FIG. 3A to be maintained within the databases 126. In embodiment 370, the rule table 324 includes a field for a "product" and a field for "keywords." As described below, the query analyzing applications 234 may determine associations between keywords and products, maintaining corresponding records in rule table 324.

FIG. 3D is a relationship diagram 390 that shows relationships between the query applications 234 and storage mediums 382. The query analyzing applications 234 may store data, such as the data shown to be maintained in tables 300 of FIG. 3A, in various storage mediums, including a file system (not shown), a memory (not shown), databases 126, or another storage medium (not shown).

Figure 4A:
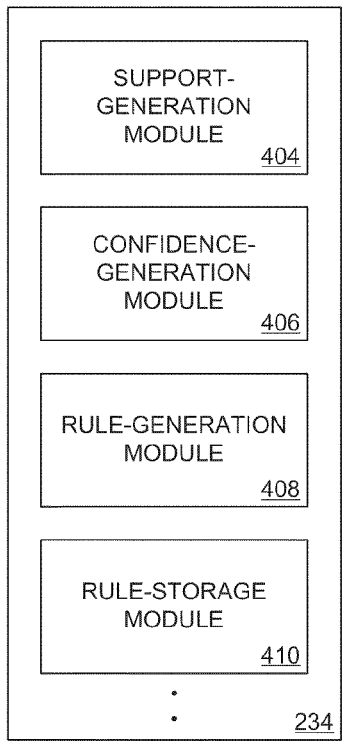
FIG. 4A is a block diagram of various modules of an example embodiment of one of the query analyzing applications that is shown in FIG. 2.

FIG. 4A is a block diagram of various modules of an example embodiment of one of the query analyzing applications 234 shown in FIG. 2. The various modules include a support-generation module 404, a confidence-generation module 406, a rule-generation module 408, and a rule-storage module 410.

The query analyzing application 234 may maintain rules associating a product at a granularity of keywords, sets of keywords, or subsets of keywords in a query. Informally, the query analyzing application 234 may mine rules of the following form:

If a user types the keywords $\{k_1$ and $k_2\}$ he or she is interested in product $p_1$.

In other words, the query analyzing applications 234 considers that a presence of a keyword or keywords in a query could be indicative of interest in a product. For example, the keyword or keywords could play a role in identifying the product a user intends to buy. Thus, the query analyzing application 234 may associate the keyword or keywords with the product. Such associations may conveniently be labeled "product intention rules." For instance, an informal product intention rule could be the following: Whenever the query contains the keywords {Microsoft player}, the user is interested in a Microsoft Zune MP3 player. The query analyzing application 234 may mine product intention rules efficiently from large transaction logs, a real-time transaction data or other sets of data associated with the networked system 102. Raw data from which product intention rules are mined (for example, raw data in the transaction logs), may include query-to-purchased-product pairs that may be stored after every successful transaction between the user and the networked system 102. For example, as described above, query-to-purchased-product pairs may be stored in the transaction table 306 and query information may be stored in the query table 320.

Mining all the product intention rules from large data sets may be a challenging task as potentially there are many (e.g., 2 raised to the power of the number of unique keywords) such rule possibilities. For example, the Apriori algorithm, which is a well-known algorithm for association rule mining, mines associations between items that belong to a set with bag semantics (e.g., items in a shopping cart that tend to coexist together). Mining such associations is different from mining product intention rules that associate semantically different entities (e.g., keywords and products). However, a trick can be applied to use the Apriori algorithm to mine product intention rules. An example embodiment considers the product and keywords issued in the query as part of a bag, essentially treating the product as semantically equivalent to a keyword. While counting the statistics, any subset that does not contain a product may be thrown away; in other words, only those subsets that contain a product may be considered. A drawback of the Apriori algorithm is that it may require multiple passes over the raw data, which would not scale well to a large networked system 102. Therefore, the query analyzing application 234 may apply a process of mining product intention rules from large datasets, the process including intelligently pruning solution spaces that cannot contain product intention rules.

Formally, a product intention rule R may be of the following form:

$\{K_1, K_2, \ldots K_n\} \Rightarrow P_i$ where $\{K_1, K_2, \ldots K_n\}$ represents the set of keywords and $P_i$ represents a product identifier (ID).

Let R.keywordset represent the set of keywords present in the product intention rule R. Let R.product represent the product in the product intention rule R. For example, the query analyzing applications 234 may select the set of keywords and the product from the raw data. Let R.support represent a support of the product intention rule R, such as a number of times users have issued queries that contain all the keywords. The support-generation module 404 may generate this support value. In one example embodiment, order of the keywords in the rule is not considered. This notion of order independence may be extended to query semantics and how queries are evaluated. Let R.confidence represent a confidence of the product intention rule R, such as a percentage of the product $P_i$ purchased with respect to the total number of products purchased whenever the keywords were issued as part of a query. The confidence-generation module 406 may generate this confidence value.

Informally, a product intention rule may state that whenever a user transmits a certain set of keywords, the user is highly likely (or probable) to purchase a particular product, this likelihood or probability being expressed with a particular support and confidence.

The rule-generation module 408 may, given, for example, a large database of query-product purchased pairs or a transaction log ($T_L$), generate product intention rules with, for example, support$\geq T_s$ and confidence$\geq T_c$, where $T_s$ and $T_c$ are predefined support and confidence thresholds. The rule-generation module 408 operatively ensure that no two mined product intention rules are redundant. For example, two product intention rules $R_1$ and $R_2$ may be regarded as being redundant if the keyword set of $R_1$ is a subset of keyword of $R_2$ or vice versa. That is, if $\|R_1.keywordset\| \subset \|R_2.keywordset\|$ or $\|R_2.keywordset\| \subset \|R_1.keywordset\|$. The two product intention rules $R_1$ and $R_2$ may also be regarded as being redundant if both product intention rules predict the same product.

After a product intention rule has been generated, the rule-storage module 410 may store the rule in one of the storage mediums 382 of FIG. 3D, such as one of the databases 126.

One example method of generating product intention rules for a large set of raw data may be to enumerate multiple subsets (e.g., all possible) subsets of keywords and check whether a product intention rule can be generated by checking the support and confidence of each subset. However, a complexity of such an algorithm is exponential (e.g., 2 raised to a power of the number of unique keywords), which may be such a large number that checking the support and confidence of each subset becomes intractable.

Thus, a further example embodiment of the query analyzing application 234 may frame the problem of identifying a complete set of product intention rules as one involving searching through a powerset of the set of keywords having a predetermined support and confidence.

An example is now used to describe operation of an example embodiment of an algorithm to generate product intention rules. Assume that an alphabet of keywords consists of three keywords {DANISH, IPOD, NANO}. In this example, the query analyzing application 234 may enumerate all possible subsets of the alphabet, taking care that subsets are enumerated only once. In other words, both {IPOD, NANO} and {NANO, IPOD} are not enumerated.

To achieve this non-redundant enumeration, an order is imposed on the strings and subsets are enumerated according to the order. FIG. 6A illustrates an enumeration tree 600 containing all possible non-redundant subsets of this example alphabet. One example way to generate the desired rules is to visit each node in the enumeration tree and decide if a rule can be constructed for that node. Support of a node may then be calculated by, for example, counting the number of times the keywords of the node are present in a query issued by a user.

A confidence may be calculated by, for example, counting the number of times a most prominent product was purchased after such queries were issued. This process is exponential and therefore intractable. In order to address this issue, the query analyzing application 234 may invoke one or more pruning rules, which in turn apply certain pruning criteria.

Before discussing the pruning criteria, a discussion of the effects of pruning a node is provided. Pruning/removing a node in the enumeration tree automatically removes all the node's children. For instance, pruning the node {DANISH} of the enumeration tree 600 of FIG. 6A prunes all the nodes underneath {DANISH}. This is a useful property, because pruning a node reduces the number of nodes to be explored drastically.

A discussion is now provided regarding how the pruning rules, invoked by the query analyzing application 234, may be used to reduce storage requirements. Low-support pruning: If the support of a subset/node $n_1$ in an enumeration tree is lower than a threshold $T_1$, there cannot exist another node $n_2$ that is a descendent of the node $n_1$ and that has support that is greater than or equal to $T_1$. Hence node $n_1$ can be pruned. Recall that support of a node $n_1$ is always greater than the support of all its descendants. For instance, consider two nodes {DANISH} and {DANISH, IPOD}. Semantically, the support for the node {DANISH} (e.g., the number of times the keyword {DANISH} was found in a query) may also include the support for the keywords DANISH and IPOD (e.g., the number of times the keywords DANISH and IPOD were provided in a query). Hence, it is straightforward to see why pruning a node based on support constraints does not remove any potential node for which a product intention rule can be created.

High-confidence pruning: If there exists a node $n_i$ with support $s_i$ and confidence $c_i$, satisfying the inequality $(1-c_i) s_i \leq T_S$, then node $n_i$ can be pruned. Informally, given a set of keywords, if there is a high degree of confidence that the user is interested in a particular product, the node that represents the associated set of keywords may be pruned after generating the rule for that node, provided it meets the support constraints. In other words, a node can be pruned when it is impossible for a descendent of the node to satisfy the support constraints and yet predict a different product. For instance, consider the node {DANISH}. If it can be determined with 90% confidence that whenever the keyword DANISH is part of a user query, the user is interested in Danish chips. Assume that support for the node {DANISH} is 100. Therefore, only 10 times, users have given a query that contains the keyword DANISH and were interested in a different product. If 10 is lower than a predetermined minimum support, then the node can be pruned. The descendants of the node {DANISH} cannot create a new rule that contains a different product than Danish chips.

It will be appreciated that there could exist a node {DANISH, CHIPS} that associates to the product Danish chips with 100% confidence and could potentially also meet the support constraints. However, generating such a rule is redundant, because it is known that whenever the user inputs DANISH, the user is interested in Danish chips. The right-hand side of the inequality represents the maximum number of queries that contain the keywords in the node and can potentially map to a different product. If upper bound is lower than predetermined support constraints, the node can be pruned.

Figure 4B:
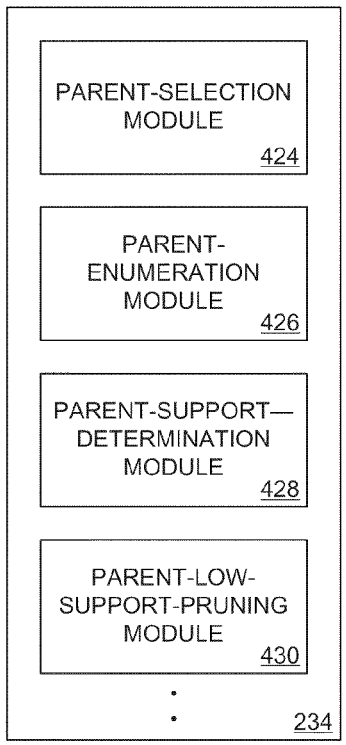
FIG. 4B is a block diagram of various additional modules of an example embodiment of one of the query analyzing applications that is shown in FIG. 2.

FIG. 4B is a block diagram of various additional modules of an example embodiment of one of the query analyzing applications 234 shown in FIG. 2. The various additional modules include a parent-selection module 424, a parent-enumeration module 426, a parent-support-determination module 428, and a parent-low-support-pruning module 430.

Figure 4C:
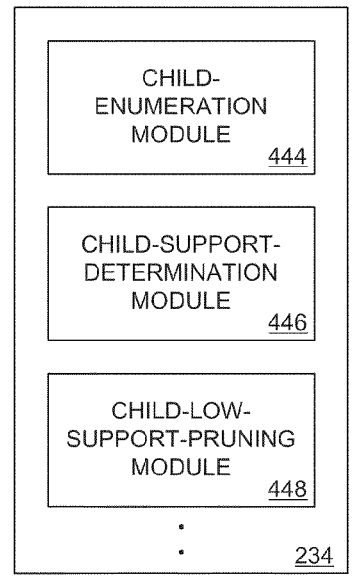
FIG. 4C is a block diagram of various additional modules of an example embodiment of one of the query analyzing applications that is shown in FIG. 2.

FIG. 4C is a block diagram of various additional modules of an example embodiment of one of the query analyzing applications 234 shown in FIG. 2. The various additional modules include a child-enumeration module 444, a child-support-determination module 446, and a child-low-support-pruning module 448.

Figure 4D:
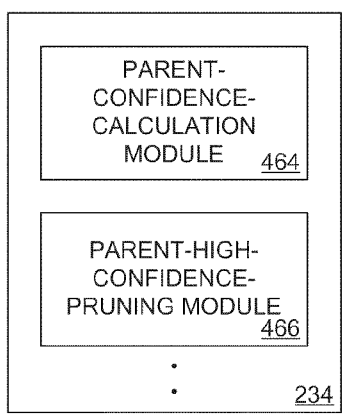
FIG. 4D is a block diagram of various additional modules of an example embodiment of one of the query analyzing applications that is shown in FIG. 2.

FIG. 4D is a block diagram of various additional modules of an example embodiment of one of the query analyzing applications 234 shown in FIG. 2. The various additional modules include a parent-confidence-calculation module 464 and a parent-high-confidence-pruning module 466.

Figure 4E:
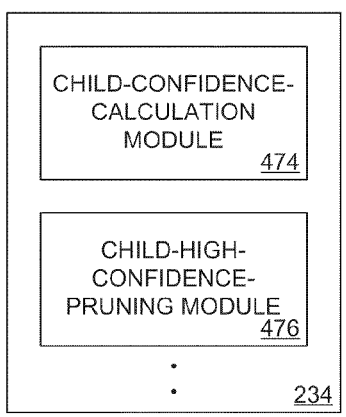
FIG. 4E is a block diagram of various additional modules of an example embodiment of one of the query analyzing applications that is shown in FIG. 2.

FIG. 4E is a block diagram of various additional modules of an example embodiment of one of the query analyzing applications 234 shown in FIG. 2. The various additional modules include a child-confidence calculation module 474 and a child-high-confidence-pruning module 476.

A description of an algorithm that may be executed by the query analyzing application 234, according to an example embodiment, is now described. The query analyzing application 234 may select a first-level node using the parent-selection module 424 and enumerate the first-level node using the parent-enumeration module 426. For every node visited, The query analyzing application 234 may attempt to generate a product intention rule. For example, the query analyzing application 234 may check the support of the first-level node using the parent-support-determination module 428. If the support is lower than the support constraints, the query analyzing application 234 may prune the node (for example, using the parent-low-support-pruning module 430). The query analyzing application 234 may also check the confidence of the first-level node using the parent-confidence-calculation module 464. If the high-confidence pruning applies to this node, then The query analyzing application 234 may generate a product intention rule (for example, using the rule-generation module 408), store the product intention rule (for example, using the rule-storage module 410), and prune the node (for example, using the parent-high-confidence pruning module 466).

Note: there may be cases where a product intention rule cannot be created for a node, but the node still cannot be pruned. For example, the node {IPOD} may be associated with many products, including iPod nano, iPod touch, and so on. Although the query analyzing application 234 may not be able to create a rule for {IPOD}, the query analyzing application 234 may still need to enumerate the children of the node {IPOD}. Hence, if a node cannot be pruned, its children may be enumerated (for example, using child-enumeration module 444). The query analyzing application 234 may then check whether there is support for each of the children (using, for example, the child-support-determination module 446). If there is no support for a child node, the query analyzing application 234 may prune the child (for example, using the child-low-support-pruning module 448). The query analyzing application 234 may also check whether a rule can be created for the children (for example, using the child-confidence-calculation module 474). If the rule can be created for a child node, the query analyzing application 234 may generate a product intention rule (for example, using the rule-generation module 408), store the product intention rule (for example, using the rule-storage module 410), and prune the child node (for example, using the child-high-confidence-pruning module 476). This process is recursively done, thereby generating product intention rules.

Figure 4F:
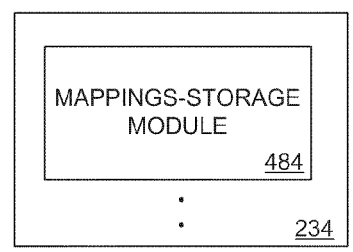
FIG. 4F is a block diagram of an additional module of an example embodiment of one of the query analyzing applications that is shown in FIG. 2.

FIG. 4F is a block diagram of a mappings-storage module 484 of an example embodiment of one of the query analyzing applications 234 that is shown in FIG. 2.

A discussion is now provided regarding the maintenance of the counts of the keyword subsets used in pruning the nodes. Recall that to prune a node, the support and confidence of a rule, which can be created for that node in the enumeration tree, need to be calculated. The mappings-storage module 484 may maintain a simple hashtable that logically stores a mapping from keyword subsets and the different products that were purchased from the queries that contain the keyword subset. The mappings-storage module 484 may not only maintain product IDs, but their respective counts (e.g., the number of times that particular product was purchased) as well. For instance, an example of a hashtable entry may be the following: {IPOD, NANO}→{Ipod_nano(100), Microsoft_Zune(1)}. The entry states that 101 times keywords IPOD and NANO were present in a query, and users purchased the iPod nano product 100 times and the Microsoft Zune product one time. Populating such a table may require a single pass over the transactions logs. However, memory required is potentially exponential to the number of keywords. Another interesting property of a hash table is that it can be parallelized very easily, by splitting the hashtable and maintaining them in multiple computers. Note that because the query analyzing applications 234 may maintain all the keyword subset counts, they may easily apply a brute force algorithm that checks every hashtable entry and writes the determined rules. However, such an algorithm can potentially take a long time, while our enumeration tree based algorithm may generate the determined rules within a fraction of a time of the brute force algorithm. This is especially true in the context of systems which inherently contain a very long tail distribution of queries.

Figure 5A:
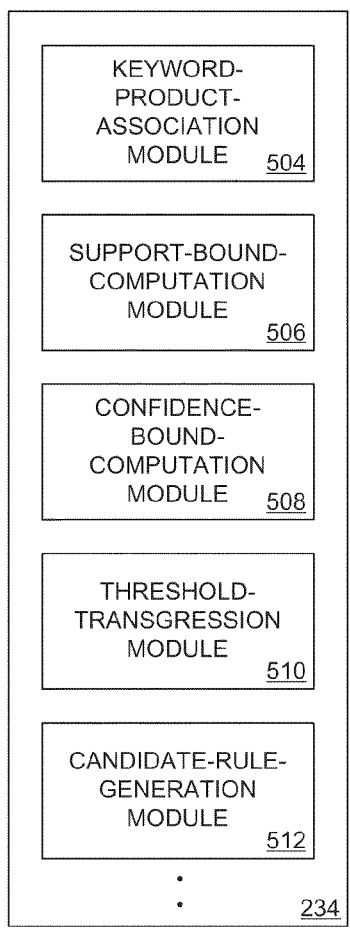
FIG. 5A is a block diagram of various additional modules of an example embodiment of one of the query analyzing applications that is shown in FIG. 2.

FIG. 5A is a block diagram of various additional modules of an example embodiment of one of the query analyzing applications 234 that is shown in FIG. 2. The various additional modules include a keyword-product-association module 504, a support-bound-computation module 506, a confidence-bound-computation module 508, a threshold-transgression module 510, and a candidate-rule-generation module 512.

Operations performed by these various modules of the query analyzing application 234 to mine the product intention rules from raw transaction data are now described. Various embodiments may omit some of the following operations or perform some of the following operations in a different order.

Operation 1: the query analyzing application 234 may make one pass over a transaction log (or other raw data set) $T_L$ and generate the product information of unique keywords encountered in the transaction log (for example, using keyword-product-association module 504). Transaction log $T_L$ may be a set of query-product pairs. Let $PR_U$ represent the product information maintained for all unique keywords. FIG. 6B shows an example of product information maintained for unique keywords. $PR_U$ may include a mapping of the keyword used and all subsequent products purchased with their counts.

Operation 2: the query analyzing application 234 may apply low-support pruning and high-confidence pruning for unique keywords present in $PR_U$ (for example, using modules 424-476). In low-support pruning, keywords with support (e.g., the sum of the frequencies of all the products that a keyword maps to in $PR_U$) lower than the support threshold $T_s$ may be removed. Also, keywords that map to a particular product with confidence higher than Ts may be removed as well. If a keyword is removed by high-confidence pruning, then the corresponding rule may be generated and added to the rule base $R_B$ (corresponding to, for example, the rule table 324). The rule base $R_B$ may contain all the generated rules once the query analyzing application 234 terminates. Keywords that fail the low-support pruning test may be simply removed.

Operation 3: Now the query analyzing application 234 makes another pass over the transaction log $T_L$. For every entry e present in $T_L$, where e may be a query-product pair <q, p>, the query analyzing application 234 may compute possible keyword subsets of the query q. For every subset, it may compute the bound (or upperbound) of support and confidence of that subset from the information in $PR_U$ (for example, using the support-bound-computation module 506 and the confidence-bound-computation module 508).

An upperbound computation process that may be employed by the support-bound-computation module 506 is now described with reference to an example. Consider the product information in FIG. 6B. Consider the query {IPOD, NANO}. The first operation is to calculate the product intersection set of all keywords in the query. Let $P_I$ be the intersection set. For our query, products iPod nano and iPod nano accessories match all of the keywords. Hence, $P_I$={IPOD_NANO, IPOD_NANO_ACCESSORIES}. Now consider the iPod nano product. From the production information it can be determined that whenever the query contains the word IPOD, an iPod nano product was purchased 3 times. Also, whenever the query contains the word NANO, an iPod nano was purchased 10 times. Therefore, the upperbound on purchases of an iPod nano when the query contains the both the words IPOD and NANO is 3, the minimum of the two counts. If the upperbound value is more than 3 it would violate our information on the number of times the word iPod was used and iPod nano was purchased. The same process can be repeated for all products in the intersection set $P_I$. The summation of all the upperbound values of products in $P_I$ provides us the upperbound of the support of the keyword subset. Hence, in our example, the support upperbound will be 3+1=4.

Once the keyword support upperbound is computed, calculation of the confidence upperbound, which may be performed by confidence-bound-computation module 508, is relatively easier. Let us consider our earlier example of the query {IPOD, NANO} and the product intersection set $P_I$={IPOD_NANO, IPOD_NANO_ACCESSORIES}. The most popular product in the intersection set $P_I$ across the keywords from the product information $PR_U$ can be determined. In our example, iPod nano is the product. The upperbound of the product is computed as described above, and this number is divided by the support upperbound to gain the upperbound on the confidence.

For example, given a query {IPOD NANO}, the query analyzing application 234 may compute the upperbound of support and confidence for {IPOD}, {NANO}, and {IPOD NANO}. If the upperbounds of confidence and support of a keyword subset belonging to a query is greater than $T_s$ and $T_c$, respectively (which, for example, the query analyzing application 234 may determine using the threshold-transgression module 510), then the query analyzing application 234 may add the keywords subset to a candidate keyword subset list (for example, using the candidate-rule-generation module 512). This list may be maintained on disk ensuring that no memory is utilized for this purpose. Note that the candidate keyword subset list can contain repetitions with respect to the keyword subsets.

Operation 4: the query analyzing application 234 may load the candidate keyword subset list into memory. Any duplicates found may be removed. The query analyzing application 234 may make a third pass over the transaction log $T_L$ and generate the product information of all keyword subsets in the candidate keyword subset list.

Operation 5: Once the production information is computed for all entries in the candidate keyword subset list, the query analyzing application 234 may iterate over the list and attempt to generate a product intention rule for members in the list. Every member or keyword subset may satisfy the support constraints and confidence constraints. For example, consider the keyword subset {DANISH, SNACKS} in FIG. 6B. A product intention rule generated for the keyword subset may be {DANISH, SNACKS}=>danish_cookies. This product intention rule may have a support of 9 and confidence of 82%. If these numbers transgress predefined support and confidence thresholds, the query analyzing application 234 may add the product intention rule to the rule base $R_B$. $R_B$ may include a set of similarly determined and added product intention rules.

Figure 5B:
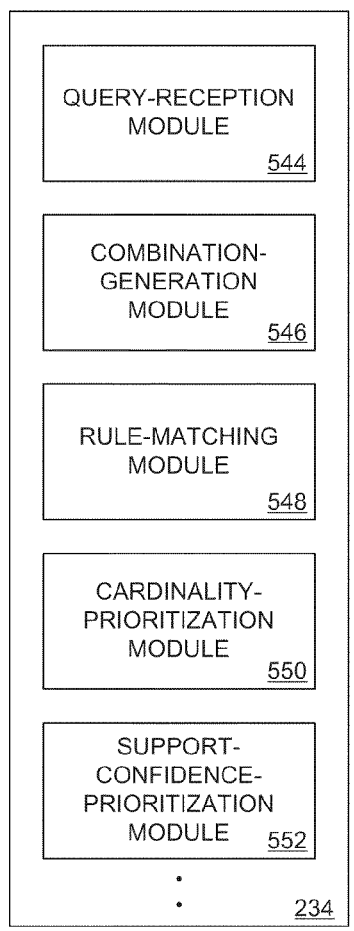
FIG. 5B is a block diagram of various additional modules of an example embodiment of one of the query analyzing applications that is shown in FIG. 2.

FIG. 5B is a block diagram of various additional modules of an example embodiment of one of the query analyzing applications 234 that is shown in FIG. 2. The various additional modules include a query-reception module 544, a combination-generation module 546, a rule-matching module 548, a cardinality-prioritization module 550, and a support-confidence-prioritization module 552.

The above discussion relates to how product intention rules are generated. A description is now provided of how the product intention rules are utilized for prediction purposes. The one of the embodiments of the query analyzing applications 234 may maintain the product intention rules in the form of a hashtable. That allows a quick look up of the rules that apply to a query. When the user issues a query (that, for example, is received by the query-reception module 544), the combination-generation module 546 may generate possible subsets of the query and check if the subsets match any of the rules in the hashtable. Generating all possible subsets is an exponential exercise; however, because typical queries are less than 4 keywords, all possible subsets can be generated very quickly. Because the combination-generation module 546 may generate all possible subsets of a query and the rule-matching module 548 may check whether the possible subsets match a rule, it is possible that a query matches more than one rule. For example, consider the query "PLAYSTATION POKER GAME." Subsets of keywords of this query can potentially match the following rules: {PLAYSTATION}=>Playstation 3 and {PLAYSTATION; POKER}=>World Series of Poker, Playstation 3. In other words, there may be uncertainty in predicting the product, since multiple rules can fire. The fired rules (that is, rules that match a subset of the query) may be ordered by the cardinality-prioritization module 550 or the support-confidence-prioritization module 552. The cardinality-prioritization module 550 may order the rules according to the following criterion: Rule R1 precedes rule R2 if the cardinality of the keyword set is larger than R2. The support-confidence-prioritization module 552 may order the rules according to the following criteria: if the cardinalities of the keyword set are equal, then confidence of R1 is more than R2. If the confidence of R1 is equal to R2, then support of R1 is more than R2.

Figure 5C:
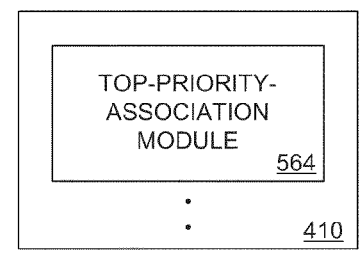
FIG. 5C is a block diagram of an additional module of an example embodiment of one of the query analyzing applications that is shown in FIG. 2.

FIG. 5C is a block diagram of a top-priority-association module 564 of an example embodiment of one of the query analyzing applications 234 that is shown in FIG. 2. Once all the rules that match a query are ordered, the top-priority-association module 564 may choose the topmost rule, and the product it translates to may be chosen as the most likely product that the user is interested.

Figure 5D:
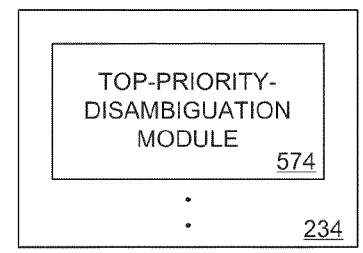
FIG. 5D is a block diagram of an additional module of an example embodiment of one of the query analyzing applications that is shown in FIG. 2.

FIG. 5D is a block diagram of a top-priority-disambiguation module 574 of an example embodiment of one of the query analyzing applications 234 that is shown in FIG. 2. It must be noted that there is no actual requirement to predict only one product. A recommender system may pick the top k products from the ordered fired rules and request a disambiguation, which is a practice currently followed in some e-commerce portals.

FIG. 6A is tree diagram of an example embodiment of an enumeration tree 600. The enumeration tree 600 contains three top-level nodes. From left to right, the first top-level node is associated with the keyword DANISH, the second top-level node is associated with the keyword IPOD, and the third top-level node is associated with the word NANO. The top-level node associated with the keyword DANISH has two child nodes. From left to right, the first child node is associated with the keywords DANISH and IPOD and the second child node is associated with the keywords DANISH and NANO. The child node associated with the keywords DANISH and IPOD also has a child node that is associated with the keywords DANISH, IPOD, and NANO. The top-level node associated with the keyword IPOD also has a child node that is associated with the keywords IPOD and NANO. Various aspects of enumeration tree 600 are discussed in detail with reference to FIG. 4A above.

FIG. 6B is a table of example mappings 660 of query information to the number of times particular products were purchased. The entries shown in this table are discussed in detail with reference to FIG. 3B and FIG. 5A above.

Figure 7A:
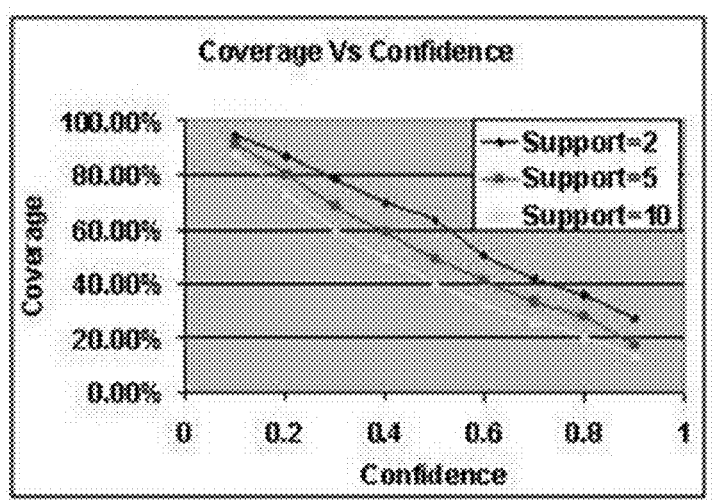
FIG. 7A is a graph of an example relationship between coverage and confidence of an example embodiment.

FIG. 7A is a graph of an example relationship 700 between coverage of products and confidence and support thresholds of an example embodiment. In this graph, the coverage of products included in a product intention rule decreased as the confidence and support thresholds increased.

Figure 7B:
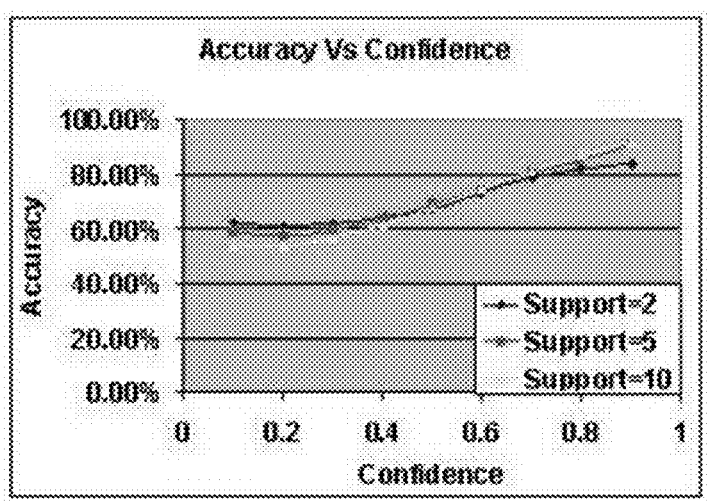
FIG. 7B is a graph of an example relationship between accuracy and confidence of an example embodiment.

FIG. 7B is a graph of an example relationship 720 between accuracy of predictions and the confidence and support thresholds of an example embodiment. In this graph, the accuracy of predictions increased as the confidence and support thresholds increased.

Figure 7C:
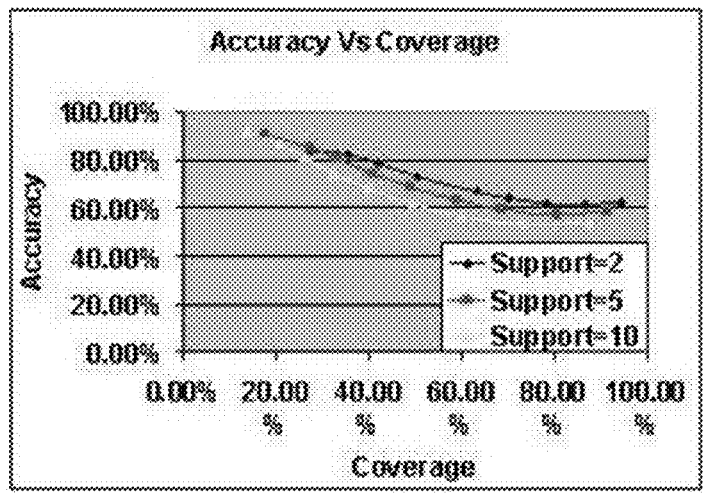
FIG. 7C is a graph of an example relationship between accuracy and coverage of an example embodiment.

FIG. 7C is a graph of an example relationship 740 between accuracy of predictions and coverage and support thresholds of an example embodiment. In this graph, the accuracy decreased as the coverage and support values decreased.

Figure 8:
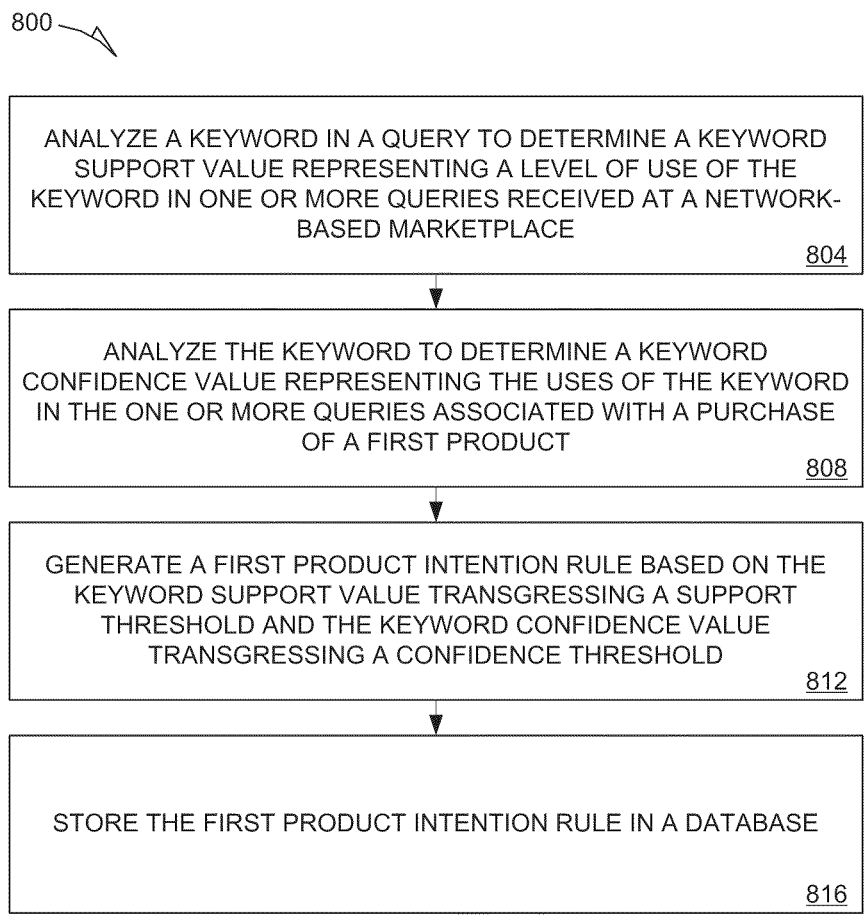
FIG. 8 is a flowchart of an example embodiment of a method to generate a first product intention rule.

FIG. 8 is a flowchart of an example embodiment of a method 800 to generate a product intention rule. The method 800 includes, at operation 804, analyzing a keyword query to determine a keyword support value representing a level of use of the keyword in one or more queries received at a network-based marketplace. At operation 808, the keyword is analyzed to determine a keyword confidence value representing the uses of the keyword in the one or more queries associated with a purchase of a first product. At operation 812, a first product intention rule is generated based on the keyword support value transgressing a support threshold and the keyword confidence value transgressing a confidence threshold, and at operation 816 the first product intention rule is stored in a database.

Figure 9:
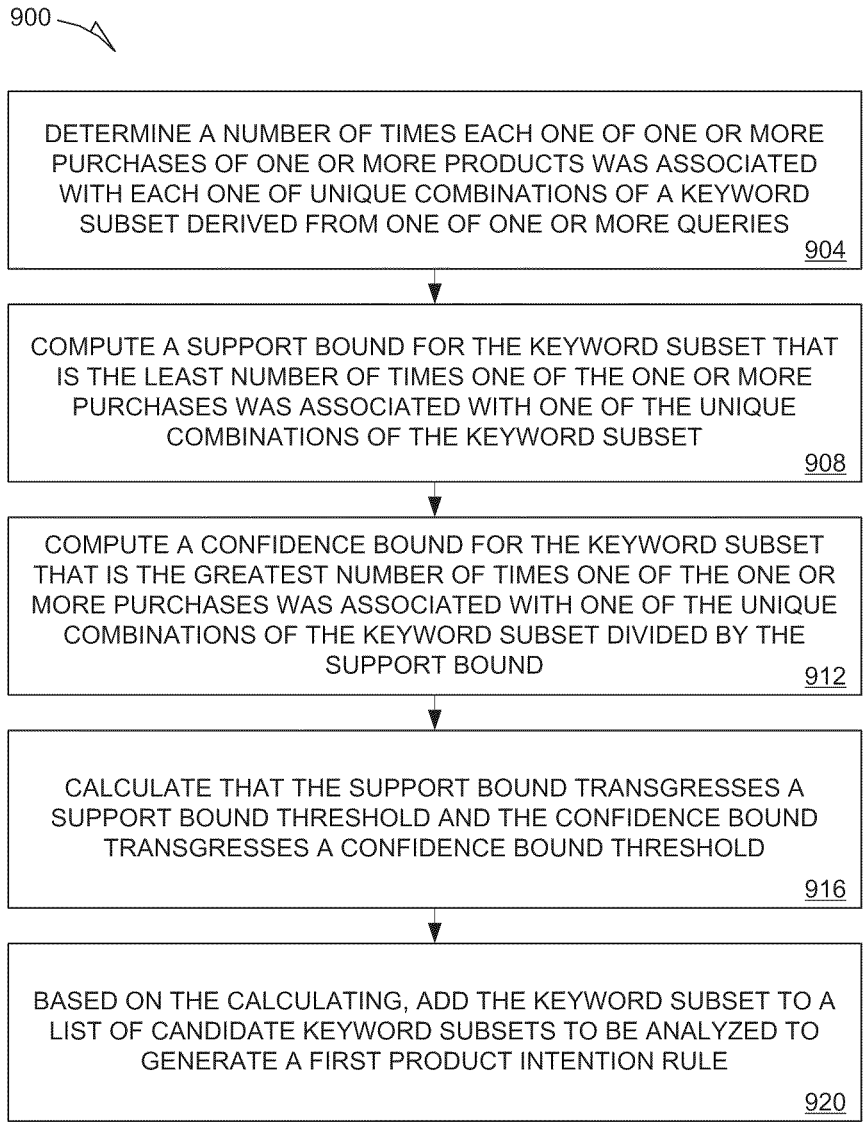
FIG. 9 is a flowchart of an example embodiment of a method to generate a first product intention rule from candidate keyword subsets.

FIG. 9 is a flowchart of an example embodiment of a method 900 to generate a product intention rule using candidate keyword subsets. The method 900 includes determining, at operation 904, a number of times each one of one or more purchases of one or more products was associated with each one of unique combinations of a keyword subset derived from one of one or more queries. At operation 908, a support bound is computed for the keyword subset that is the least number of times one of the one or more purchases was associated with one of the unique combinations of the keyword subset. At operation 912, a confidence bound is computed for the keyword subset that is the greatest number of times one of the one or more purchases was associated with one of the unique combinations of the keyword subset divided by the support bound. At operation 916, a calculation is made that the support bound transgresses a support bound threshold and the confidence bound transgresses a confidence bound threshold. At operation 920, based on the calculation, the keyword subset is added to a list of candidate keyword subsets to be analyzed to generate a first product intention rule.

Figure 10:
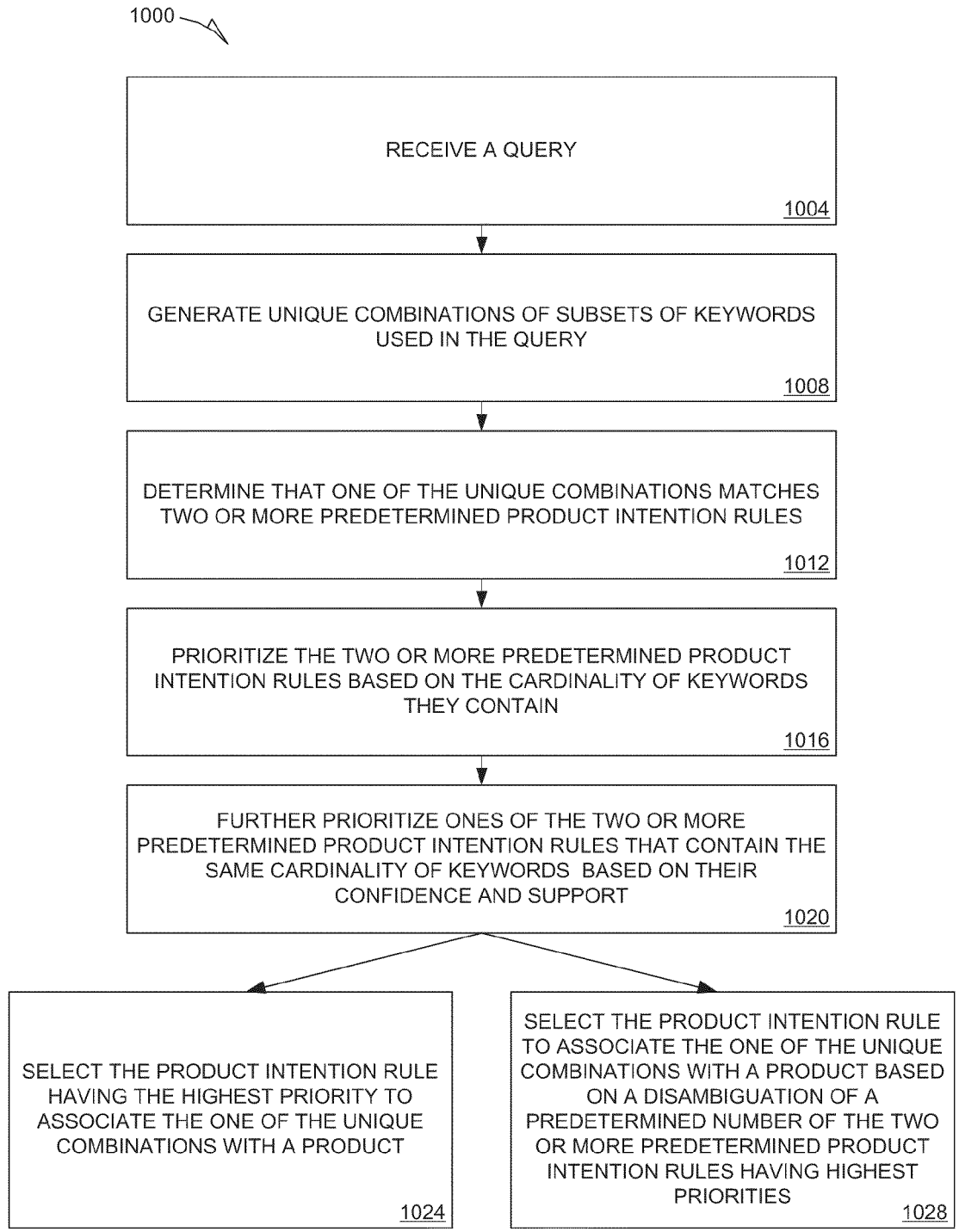
FIG. 10 is a flowchart of an example embodiment of a method to prioritize product intention rules.

FIG. 10 is a flowchart of an example embodiment of a method 1000 to prioritize product intention rules. The method 1000 includes receiving, at operation 1004, a query. At operation 1008, unique combinations of subsets of keywords used in the query are generated. At operation 1012, a determination is made that one of the unique combinations matches two or more predetermined product intention rules. At operation 1016, the two or more predetermined product intention rules are prioritized based on the cardinality of keywords they contain. At operation 1020, ones of the two or more predetermined product intention rules that contain the same cardinality of keywords are further prioritized based on their confidence and support. At operation 1024 the product intention rule having the highest priority is selected to associate the one of the unique combinations with a product. At operation 1028, the product intention rule to associate the one of the unique combinations with a product is selected based on a disambiguation of a predetermined number of the two or more predetermined product intention rules having highest priorities.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and
Machine-Readable Medium

Figure 11:
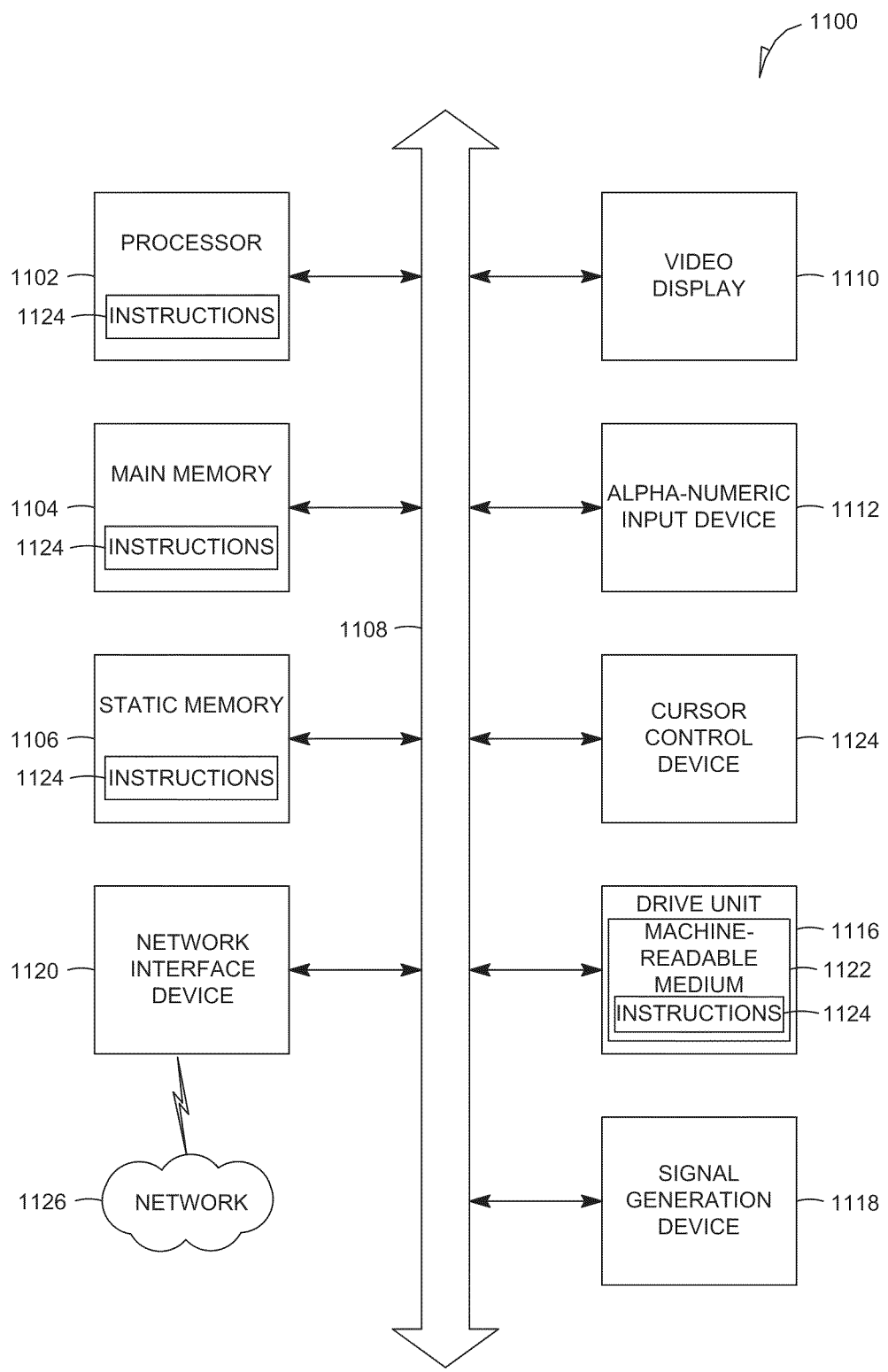
FIG. 11 is a block diagram of a machine on which an example embodiment may be executed.

FIG. 11 is a block diagram of machine in the example form of a computer system 1100 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU) or both), a main memory 1104 and a static memory 1106, which communicate with each other via a bus 1108. The computer system 1100 may further include a video display unit 1110 (e.g., a liquid crystal display (LCD) or a cathode ray tube (CRT)). The computer system 1100 also includes an alphanumeric input device 1112 (e.g., a keyboard), a user interface (UI) navigation (or cursor control) device 1114 (e.g., a mouse), a disk drive unit 1116, a signal generation device 1118 (e.g., a speaker) and a network interface device 1120.

Machine-Readable Medium

The disk drive unit 1116 includes a machine-readable medium 1122 on which is stored one or more sets of instructions and data structures (e.g., software) 1124 embodying or utilized by any one or more of the methodologies or functions described herein. The instructions 1124 may also reside, completely or at least partially, within the main memory 1104 and/or within the processor 1102 during execution thereof by the computer system 1100, the main memory 1104 and the processor 1102 also constituting machine-readable media. The instructions 1124 may also reside, completely or at least partially, within the static memory 1106.

While the machine-readable medium 1122 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1124 may further be transmitted or received over a communications network 1126 using a transmission medium. The instructions 1124 may be transmitted using the network interface device 1120 and any one of a number of well-known transfer protocols (e.g., Hyper Text Transfer Protocol or HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
    generating a keyword support value for a keyword in a query, the keyword support value representing a level of use of the keyword in one or more queries received at an e-commerce portal;
    generating a keyword confidence value representing uses of the keyword in the one or more queries associated with a purchase of a first product, wherein the generating of the keyword confidence value includes
        selecting a first-level node of an enumeration tree, the enumeration tree to include unique combinations of subsets of keywords derived from the one or more queries, and
        enumerating one of the unique combinations to associate with the first-level node based on a predetermined order of the unique combinations;
    generating a first product intention rule based on the keyword support value transgressing a support threshold and the keyword confidence value transgressing a confidence threshold;
    calculating that a product of the number of uses of the one of the unique combinations in the one or more queries and a probability of the uses being associated with a purchase of a second product is less or equal to a minimum number of uses of the one of the unique combinations in the one or more queries;
    responsive to the calculating, generating a second product intention rule for the one of the unique combinations and pruning the first-level node from the enumeration tree; and
    storing the first product intention rule and the second product intention rule in a database.

2. The method of claim 1, wherein the generating of the keyword support value comprises:
    calculating that the one of the unique combinations has a node support value that is less than a node support threshold, the node support value representing a level of use of the one of the unique combinations in the one or more queries; and
    responsive to the calculating, pruning the first-level node from the enumeration tree.

3. The method of claim 1, wherein the generating of the keyword support value comprises:
    enumerating a first one of the unique combinations to associate with the first-level node based on a predetermined order of the unique combinations;
    making a first determination that the first one of the unique combinations does not have a first node support value that is less than a node support threshold, the first node support value being equal to a number of times the first one of the unique combinations is included in the one or more queries;
    responsive to the first determination, enumerating a second one of the unique combinations to associate with a child node of the first-level node based on the predetermined order of the unique combinations;
    making a second determination that the second one of the unique combinations has a second node support value that is less than the node support threshold, the second node support value being equal to a number of times the second one of the unique combinations is included in the one or more queries; and
    responsive to the second determination, generating a second product intention rule for the second one of the unique combinations and pruning the child node from the enumeration tree.

4. The method of claim 1, further comprising storing mappings of one or more products to each one of a unique combination of subsets of keywords derived from the one or more queries.

5. The method of claim 1, wherein the generating of the first product intention rule comprises:
    determining a number of times each one of one or more purchases of one or more products was associated with each one of unique combinations of a keyword subset in one of the one or more queries;

computing a support bound for the keyword subset, the support bound being the least number of times one of the one or more purchases was associated with one of the unique combinations of the keyword subset;

computing a confidence bound for the keyword subset, the confidence bound being the greatest number of times one of the one or more purchases was associated with one of the unique combinations of the keyword subset divided by the support bound;

calculating that the support bound transgresses a support bound threshold and the confidence bound transgresses a confidence bound threshold; and based on the calculating, adding the keyword subset to a list of candidate keyword subsets to be analyzed to generate the first product intention rule.

6. A system comprising:

a support-generation module implemented by at least one processor and configured to generate a keyword support value for a keyword in a query, the keyword support value representing a level of use of the keyword in one or more queries received at an e-commerce portal;

a confidence-generation module configured to generate a keyword confidence value representing uses of the keyword in the one or more queries associated with a purchase of a first product;

a parent-selection module configured to select a first-level node of an enumeration tree, the enumeration tree to include unique combinations of subsets of keywords derived from the one or more queries;

a parent-enumeration module configured to enumerate one of the unique combinations to associate with the first-level node based on a predetermined order of the unique combinations;

a rule-generation module configured to generate a first product intention rule based on the keyword support value transgressing a support threshold and the keyword confidence value transgressing a confidence threshold;

a parent-confidence-determination module configured to calculate that a product of the number of uses of the one of the unique combinations in the one or more queries and a probability of the uses being associated with a purchase of a second product is less or equal to a minimum number of uses of the one of the unique combinations in the one or more queries;

a parent-high-confidence-pruning module configured to, responsive to the calculating, generate a second product intention rule for the one of the unique combinations and prune the first-level node from the enumeration tree; and a rule-storage module configured to store the first product intention rule and the second product intention rule in a database.

7. The system of claim 6, further comprising:

a parent-support-determination module configured to determine that the one of the unique combinations has a node support value that is less than a node support threshold, the node support value representing a level of use of the one of the unique combinations in the one or more queries; and a parent-low-support-pruning module configured to, responsive to the calculating, prune the first-level node from the enumeration tree.

8. The system of claim 6, further comprising:

the parent-enumeration module further configured to enumerate a first one of the unique combinations to associate with the first-level node based on a predetermined order of the unique combinations;

a parent-support-determination module configured to make a first determination that the first one of the unique combinations does not have a first node support value that is less than a node support threshold, the first node support value being equal to a number of times the first one of the unique combinations is included in the one or more queries;

a child-enumeration module configured to, responsive to the first determination, enumerate a second one of the unique combinations to associate with a child node of the first-level node based on the predetermined order of the unique combinations;

a child-support-determination module configured to make a second determination that the second one of the unique combinations has a second node support value that is less than the node support threshold, the second node support value being equal to a number of times the second one of the unique combinations is included in the one or more queries; and a child-low-support-pruning module configured to, responsive to the second determination, generate a second product intention rule for the second one of the unique combinations and pruning the child node from the enumeration tree.

9. The system of claim 6, further comprising a mappings-storage module configured to store mappings of one or more products to each one of a unique combination of subsets of keywords derived from the one or more queries.

10. The system of claim 6, further comprising:

a keyword-product-association module configured to determine a number of times each one of one or more purchases of one or more products was associated with each one of unique combinations of a keyword subset in one of the one or more queries;

a support-bound-computation module configured to compute a support bound for the keyword subset, the support bound being a least number of times one of the one or more purchases was associated with one of the unique combinations of the keyword subset;

a confidence-bound-computation module configured to compute a confidence bound for the keyword subset, the confidence bound being a greatest number of times one of the one or more purchases was associated with one of the unique combinations of the keyword subset divided by the support upper bound;

a threshold-transgression module configured to determine that the support bound transgresses a support bound threshold and the confidence bound transgresses a confidence bound threshold; and a candidate-rule-generation module configured to, based on the calculating, add the keyword subset to a list of candidate keyword subsets to be analyzed to generate the first product intention rule.

11. A non-transitory machine-readable storage medium embodying a set of instructions that, when executed by a processor, causes the processor to perform a method, the method comprising:

generating a keyword support value for a keyword in a query, the keyword support value representing a level of use of the keyword in one or more queries received at an e-commerce portal;

generating a keyword confidence value representing uses of the keyword in the one or more queries associated with a purchase of a first product, wherein the generating of the keyword confidence value includes selecting a first-level node of an enumeration tree, the enumeration tree to include unique combinations of subsets of keywords derived from the one or more queries;

enumerating one of the unique combinations to associate with the first-level node based on a predetermined order of the unique combinations;

generating a first product intention rule based on the keyword support value transgressing a support threshold and the keyword confidence value transgressing a confidence threshold;

calculating that a product of the number of uses of the one of the unique combinations in the one or more queries and a probability of the uses being associated with a purchase of a second product is less or equal to a minimum number of uses of the one of the unique combinations in the one or more queries;

responsive to the calculating, generating a second product intention rule for the one of the unique combinations and pruning the first-level node from the enumeration tree; and storing the first product intention rule and the second product intention rule in a database.

12. The non-transitory machine-readable storage medium of claim 11, wherein the generating of the first product intention rule comprises:

calculating that the one of the unique combinations has a node support value that is less than a node support threshold, the node support value representing a level of use of the one of the unique combinations in the one or more queries; and responsive to the calculating, pruning the first-level node from the enumeration tree.

13. The non-transitory machine-readable storage medium of claim 11, wherein the generating of the first product intention rule comprises:

enumerating a first one of the unique combinations to associate with the first-level node based on a predetermined order of the unique combinations;

making a first determination that the first one of the unique combinations does not have a first node support value that is less than a node support threshold, the first node support value being equal to a number of times the first one of the unique combinations is included in the one or more queries;

responsive to the first determination, enumerating a second one of the unique combinations to associate with a child node of the first-level node based on the predetermined order of the unique combinations;

making a second determination that the second one of the unique combinations has a second node support value that is less than the node support threshold, the second node support value being equal to a number of times the second one of the unique combinations is included in the one or more queries; and responsive to the second determination, generating a second product intention rule for the second one of the unique combinations and pruning the child node from the enumeration tree.

14. The non-transitory machine-readable storage medium of claim 11, wherein the generating of the first product intention rule comprises storing mappings of one or more products to each one of a unique combination of subsets of keywords derived from the one or more queries.

15. The non-transitory machine-readable storage medium of claim 11, wherein the generating of the first product intention rule comprises:

determining a number of times each one of one or more purchases of one or more products was associated with each one of unique combinations of a keyword subset in one of the one or more queries;

computing a support bound for the keyword subset, the support bound being a least number of times one of the one or more purchases was associated with one of the unique combinations of the keyword subset;

computing a confidence bound for the keyword subset, the confidence bound being a greatest number of times one of the one or more purchases was associated with one of the unique combinations of the keyword subset divided by the support upper bound;

calculating that the support bound transgresses a support bound threshold and the confidence bound transgresses a confidence bound threshold; and based on the calculating, adding the keyword subset to a list of candidate keyword subsets to be analyzed to generate the first product intention rule.

* * * * *

UNITED STATES PATENT AND TRADEMARK OFFICE
CERTIFICATE OF CORRECTION

PATENT NO. : 8,515,966 B2  
APPLICATION NO. : 12/684866  
DATED : August 20, 2013  
INVENTOR(S) : Jammalamadaka et al.

Page 1 of 1

It is certified that error appears in the above-identified patent and that said Letters Patent is hereby corrected as shown below:

In the Claims

In column 22, line 2, in Claim 1, after "includes", insert --:--, therefor

In column 24, line 67, in Claim 11, after "includes", insert --:--, therefor

Signed and Sealed this
Twenty-third Day of December, 2014

Michelle K. Lee
*Deputy Director of the United States Patent and Trademark Office*